United States Patent [19]
Wendt, III

[11] 3,835,744

[45] Sept. 17, 1974

[54] MACHINE FOR FORMING HOLES IN ANGLE RINGS OR THE LIKE

[75] Inventor: William H. Wendt, III, River Forest, Ill.

[73] Assignee: Chicago Metal Mfg., Co., Chicago, Ill.

[22] Filed: Mar. 12, 1973

[21] Appl. No.: 339,821

[52] U.S. Cl. .................. 83/267, 83/71, 83/368, 83/411 R, 83/414, 83/560, 408/3
[51] Int. Cl. ........ B26d 5/20, B26d 5/30, B26d 7/06
[58] Field of Search ........... 83/71, 267, 368, 411 R, 83/414, 452, 559, 560; 408/3, 89, 90, 69

[56] References Cited
UNITED STATES PATENTS

| | | | |
|---|---|---|---|
| 2,745,186 | 5/1956 | Faeber | 83/560 |
| 3,391,593 | 7/1968 | Jordan | 83/559 X |
| 3,685,915 | 8/1972 | Vierstraete | 408/69 UX |
| 3,698,273 | 10/1972 | Richard et al. | 83/267 X |

*Primary Examiner*—Willie G. Abercrombie
*Attorney, Agent, or Firm*—Burmeister, York, Palmatier, Hamby & Jones

[57] ABSTRACT

The disclosed machine comprises a rotatable indexing head for holding an angle ring or the like preferably in a vertical plane. The indexing head is rotatable about a horizontal axis and is provided with a motor drive whereby the indexing head can be turned to successive positions at which holes are to be formed in the angle ring. Three jaws are slidably mounted on the indexing head to engage and clamp the ring. The jaws are operated by lead screws fitted with bevel gears which engage an axial bevel gear having a motor drive for operating the jaws. A punch or other suitable device is provided to punch the successive holes. The punch is mounted on a set of compound carriages whereby the punch can be moved radially and axially into and out of punching relation to the ring. The carriages are power operated and are arranged so that the pitch circle radius of the holes can be precisely controlled. An automatic electronic control system may be employed to control the indexing, clamping and punch positioning drives.

30 Claims, 16 Drawing Figures

MACHINE FOR FORMING HOLES IN ANGLE RINGS OR THE LIKE

This invention relates to a machine for forming holes in angle rings or other similar members, such as channel rings, flange plates and the like. The machine is also applicable to the forming of holes in a flat circular plate.

Angle rings find many applications, but are particularly useful to form end flanges on sections of pipe. An angle ring is normally L-shaped in cross section and thus comprises a cylindrical flange and an outwardly projecting radial flange.

For its most common use, the cylindrical flange of the angle ring is slipped around the end of a pipe and is welded or otherwise secured to the wall of the pipe. The radial flange of the angle ring is normally formed with a series of holes which may be employed to receive bolts or other fasteners whereby adjacent lengths of pipe may be secured together. The apertured radial flange also makes it possible to secure the pipe to a flat plate, such as the wall of a tank, duct or other enclosure.

In many cases, the holes in the radial flange of an angle ring are formed at equal intervals in the angle ring. It is a difficult and time-comsuming task to form a series of holes at the correct locations around the circumference of an angle ring, particularly when the ring is large in size and must be formed with a large number of holes.

One object of the present invention is to provide a new and improved machine having a rotatable indexing head fitted with power-operated jaws adapted to clamp the angle ring on the indexing head preferably in a vertical position so that the ring will be precisely centered.

A further object is to provide a machine having an indexing head which can be rotated by a precision motor drive so that the angle ring will be positioned correctly for the forming of each successive hole.

Another object is to provide such a new and improved machine in which the clamping force applied to the angle ring can be adjusted to allow for the size and degree of rigidity of the ring.

A further object is to provide a machine of the foregoing character having a punch or some other device for forming holes in the angle ring, such punch being mounted on a compound set of carriages having precision power drives whereby the punching position of the punch can be varied, and whereby the punch can be moved rapidly and accurately into and out of punching relation with the ring.

A further object is to provide such a new and improved machine in which one of the carriages for the punching device or the like can be caused to follow the ring so that the holes will be formed at a predetermined distance from the inner or outer periphery of the ring.

Further objects, advantages and features of the present invention will appear from the following description, taken with the accompanying drawings, in which:

Figures 1, 2:
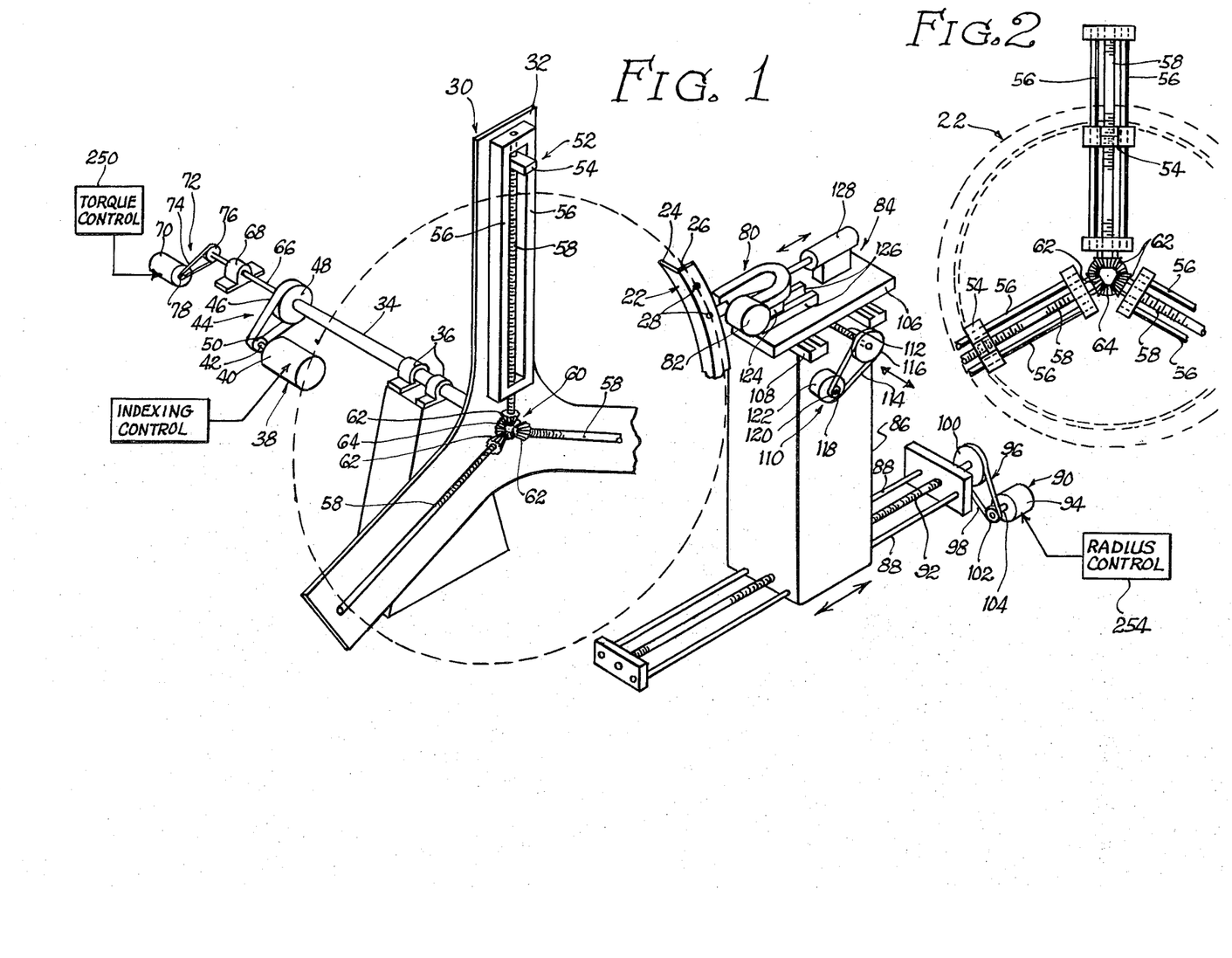
FIG. 1 is a diagrammatic perspective view of a machine to be described as an illustrative embodiment of the present invention.
FIG. 2 is a fragmentary front elevation of the machine shown in FIG. 1.

As just indicated, FIGS. 1 and 2 illustrate a machine 20 for punching or otherwise forming holes in an angle ring 22 or some other similar member, such as a channel ring, a flange ring or a circular plate.

As shown, the angle ring 22 is in the form of an angle bar made of steel or some other suitable metal and formed into a circular shape. Thus, the angle ring 22 is L-shaped in cross section and is formed with a cylindrical flange 24 and a radial flange 26, preferably projecting outwardly from the flange 24.

Angle rings of this type are commonly welded or otherwise secured to the ends of pipe sections or the like, for use in connecting adjacent pipe sections together or for connecting a pipe section to a plate or wall. For such use, the cylindrical flange 24 is welded or otherwise secured to the pipe.

It is often desirable to form a series of holes 28 in the radial flange 26 to receive bolts or other fasteners. In most cases, it is desirable that the holes 28 be equally spaced, although they could be spaced at unequal intervals. It is generally desirable to form the holes 28 around a particular pitch circle having a predetermined radius which is maintained with a high degree of accuracy. In other cases, it is desirable to form the holes 28 at a predetermined distance from the inner or outer periphery of the ring 22.

The illustrated machine 20 is provided with a rotatable indexing head 30 adapted to support the angle ring 22 preferably in a vertical plane. The illustrated indexing head 30 comprises a plate 32 or some other supporting member mounted on a shaft 34 having bearings 36 which support the shaft for rotation, preferably about a horizontal axis.

A precision power operated drive 38 is preferably provided to rotate the indexing head 30. As shown, the power drive 38 comprises a precision drive motor 40 which may be of the pulse type or any other type which is well suited for accurately indexing the head 30. The motor 40 may incorporate a gear reduction drive adapted to operate an output shaft 42 at a low speed.

A driving connection 44 is provided between the motor shaft 42 and the indexing shaft 34. As shown, the driving connection 44 may utilize one or more chains 46 strung around sprockets 48 and 50 on the indexing shaft 34 and the motor shaft 42.

A mechanism 52 is provided to clamp or otherwise secure the angle ring 22 to the indexing head 30. As shown, the clamping mechanism 52 comprises fingers or jaws 54, preferably three in number, for engaging either the inside or the outside of the ring 22, preferably the inside. The three illustrated jaws 54 are spaced at equal angular intervals around the axis of the indexing head 30. Each jaw 54 is preferably supported by guides 56 for radial sliding movement relative to the axis of the indexing head 30. A separate lead screw 58 is preferably provided on the indexing head 30 to operate each of the jaws 54. The screws 58 radiate outwardly from the central portion of the indexing head 30.

As shown, all three lead screws 58 for the jaws 54 are adapted to be rotated by a precision drive 60, which may comprise bevel gears 62 on the inner ends of the lead screws 58. All three gears 62 mesh with a centrally disposed bevel gear 64 mounted on one end of an axial shaft 66. In this case, the shaft 66 extends coaxially within the indexing shaft 34, which is hollow and tubular in form. The illustrated shaft 66 is supported by a bearing 68. A precision drive motor 70 is preferably employed to operate the shaft 66. As shown, a driving connection 72 is provided between the motor 70 and the shaft 66. The illustrated driving connection 72 comprises a chain 74 or the like strung around sprockets 76 and 78 on the shaft 66 and the shaft of the motor 70.

The motor 70 may be of the type adapted to develop a constant torque when stalled so as to produce a constant force between the jaws 54 and the angle ring 22. Such force may be adjusted by changing the energization of the motor 70 so as to vary the torque which it develops.

A hole-forming device 80 is preferably provided to form the holes 28 in the angle ring 22. The illustrated hole-forming device 80 is in the form of a punch having power operating means, such as the illustrated hydraulic cylinder 82. However, any known or suitable hole-forming device may be employed, such as a drilling device, a device utilizing heat to melt or burn the metal, or a device employing various electrical or electronic techniques for forming the holes.

It is preferred to employ a compound carriage mechanism 84 to support the hole-forming device 80 so that such device can be moved into and out of operative relation to the angle ring 22, and can be adjusted so that the holes 28 will be accurately located.

As illustrated, the compound carriage mechanism 84 comprises a first or main carriage 86, which is movable along guide means 88 preferably oriented so that movement of the carriage 86 will cause radial movement of the hole-forming device 80 relative to the axis of the indexing head 30. The illustrated guide means 88 take the form of horizontal guide bars, parallel to the vertical plane of the angle ring 22. The height of the carriage 86 is such that the hole-forming device 80 is at the same height as the axis of the indexing head 30.

A precision drive 90 is preferably provided to move the carriage 86 along the guide means 88. The illustrated drive 90 comprises a rotatable lead screw 92 which extends parallel to the guide means 88. A motor 94 is provided to rotate the lead screw 92 through a driving connection 96 illustrated as comprising a chain 98 threaded around sprockets 100 and 102. The sprocket 100 is on the end of the rotatable lead screw 92, while the sprocket 102 is on the shaft 104 of the motor 94.

The compound carriage system 84 also preferably comprises a cross carriage 106 which is movable crosswise on guide means 108 disposed on the main carriage 86. Thus, the movement of the second or cross carriage 106 is generally parallel to the axis of the indexing head 30. A precision power drive 110 may be provided to adjust the position of the cross carriage 106.

As shown, the drive 110 employs a rotatable lead screw 112 for moving the carriage 106. A chain 114 or some other driving element may be strung around sprockets 116 and 118, mounted on the lead screw 112 and on the shaft 120 of a motor 122. If desired, the drive 110 may be disconnected so that the second carriage 106 can be adjusted manually or can be allowed to float with sufficient free play to follow the angle ring 22.

A third carriage 124 is preferably provided on the second carriage 106 to support the hole-forming device 80. The third carriage 124 is supported by guide means 126 preferably oriented so that the third carriage 124 is movable in a radial direction relative to the axis of the indexing head 30. A power drive 128 is preferably provided to move the carriage 124 and the hole-forming device 80 along the guide means 126. As illustrated, the power means 128 is in the form of a fluid power cylinder operable by compressed air or hydraulic fluid under pressure.

The fluid power cylinder 128 may be employed to move the hole-forming device 80 into and out of operative relation to the angle ring 22. Thus, the cylinder 128 may be employed to retract the hole-forming device 80 away from the angle ring 22 when it is to be removed from the indexing head 30. The adjustment of the position of the hole-forming device 80 is preferably accomplished by moving the main carriage 86 and the cross carriage 106.

In particular, the motor 94 is preferably employed to adjust the position of the main carriage 86 so that the holes will be punched at the desired radial distance from the axis of the indexing head 30. The cross carriage 106 is adjusted so that the hole-forming device 80 is in the proper alignment with the flange 26 to be punched on the angle ring 22.

The precision drive 90 may be calibrated so that the main carriage 86 can be adjusted to the exact position required for any particular pitch radius at which the holes 28 are to be punched. Similarly, the drive 110 may be calibrated so that the hole-forming device 80 may be positioned correctly for any particular size of the angle ring 22.

When the hole-forming machine 20 of FIGS. 1 and 2 is to be used, the angle ring 22 to be punched is mounted on the indexing head 30 by positioning the ring so that it is in engagement with the clamping jaws or fingers 54, which can engage either the inside or the outside of the ring, usually the inside. To mount the ring 22 on the jaws 54, it may be necessary to move the jaws inwardly by operating the drive motor 70. With the ring 22 in place, the drive motor 70 is operated to move the jaws 54 outwardly into clamping engagement with the ring 22. The motor 70 is preferably energized sufficiently to produce a torque corresponding to the clamping forces to be exerted by the jaws 54. The torque developed by the motor 70 is preferably adjusted in accordance with the strength and rigidity of the angle ring 22 so that the ring will be firmly clamped, yet will not be distorted to any appreciable extent into a noncircular shape.

With the angle ring 22 mounted on the indexing head 30, the motor 92 is operated to position the carriage 86 so that the hole-forming device 80 will form the holes at the correct pitch radius. This adjustment is preferably made with the third carriage 124 retracted away from the angle ring 22. The motor 122 is preferably operated to position the second carriage 106 so that the hole-forming device 80 will be properly aligned with the angle ring 22.

The first hole 28 is formed by actuating the drive cylinder 128 so as to advance the hole-forming device 80 into its operative relationship with the flange 26 of the angle ring 22. The power cylinder 82 is then energized to punch or otherwise form the first hole.

The motor 40 is then operated to index the indexing head 30 through the correct angular interval so that the angle ring 22 will be advanced to the location at which the next hole is to be punched. The precision drive 38 is preferably calibrated so that the indexing head 30 may readily be rotated through the desired angle.

By repeating this cycle, all of the holes 28 in the angle ring 22 can be punched or otherwise formed very expeditiously. When the angle ring is to be removed, the power cylinder 128 is actuated so as to retract the carriage 124 and the hole-forming device 80 away from the angle ring 22. The motor 70 is then operated to disengage the jaws 54 from the angle ring 22.

FIGS. 3–15 illustrate a somewhat modified machine 130 which, however, is basically similar to the machine 20 of FIG. 1. To avoid needless repetition of the description, the same reference characters have been applied to those components of the machine 130 which correspond closely with the components of the machine 20. As to these corresponding components, the description of the machine 20 of FIG. 1 may also be applied to the machine 130 of FIGS. 3–15.

Figure 3:
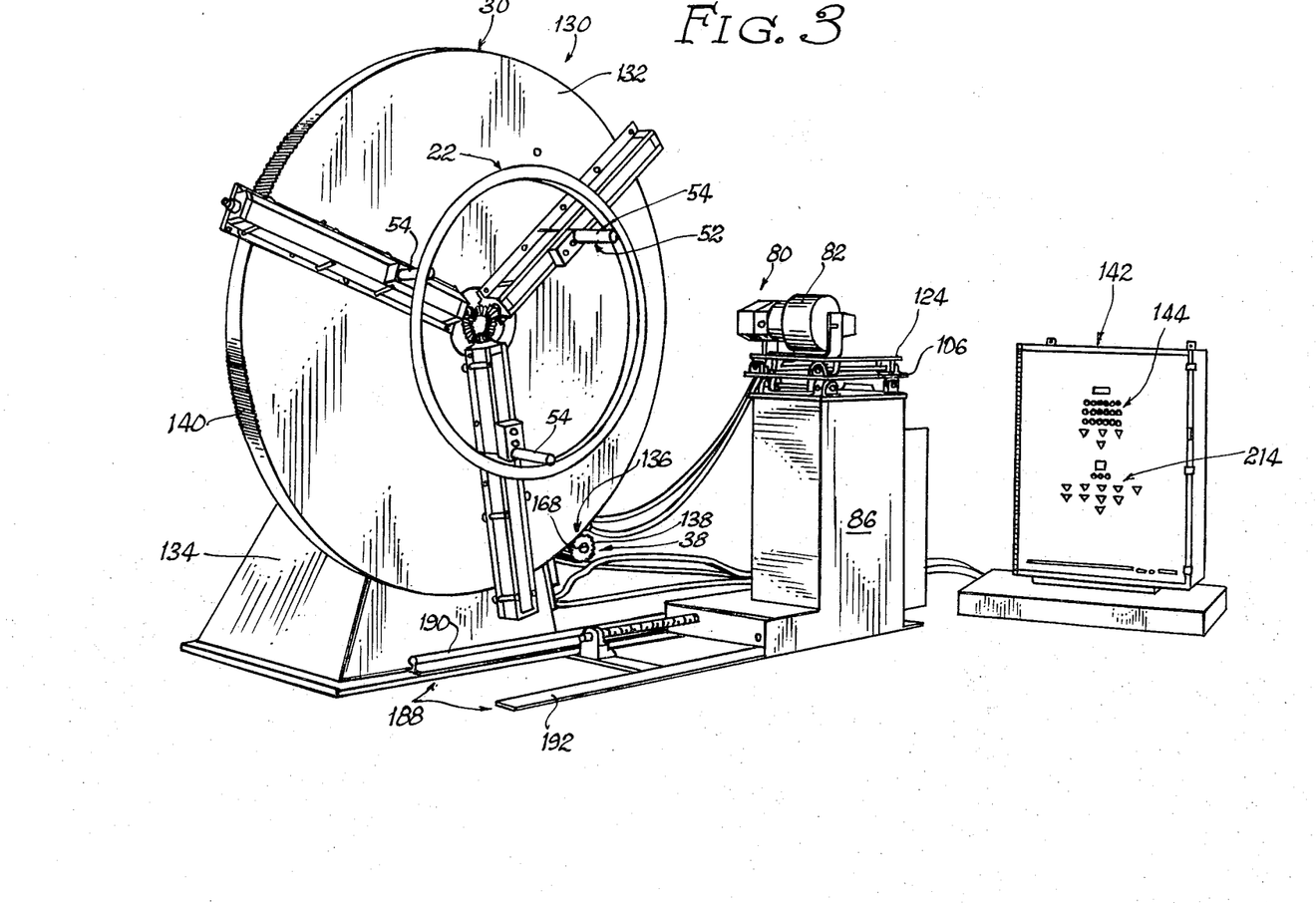
FIG. 3 is a perspective view of a modified machine to be described as a second illustrative embodiment.

Thus, the indexing head 30 of FIG. 3 comprises a generally circular supporting member 132 on which the clamping mechanism 52 for the angle ring 22 is mounted. The indexing head 30 is supported by a stand 134 on which the bearings 36 (FIG. 13) are mounted.

In this case, the precision drive 38 for the indexing head 30 employs a modified driving connection 136 (FIG. 7) between the drive motor 38 and the indexing head 30. As shown, such driving connection 136 comprises a pinion 138 meshing with a large gear 140 extending around the periphery of the circular supporting member 132. The precision drive 38 is preferably calibrated by means of an electronic control unit 142 which keeps track of the position of the motor 40 and is able to operate the motor so that one revolution of the indexing head 30 can be divided into any desired number of parts.

The illustrated electronic control unit 142 has a set of digital push buttons or other input controls 144 whereby the desired number of holes can be fed into the control unit 142. By electronic digital computations, one revolution of the indexing head 30 is then divided into a corresponding number of angular intervals. By operating the motor 40, the electronic control unit 142 is able to advance the indexing head 30 through the precise angular interval which is required between the successive holes to be formed in the ring 22.

Figure 4:
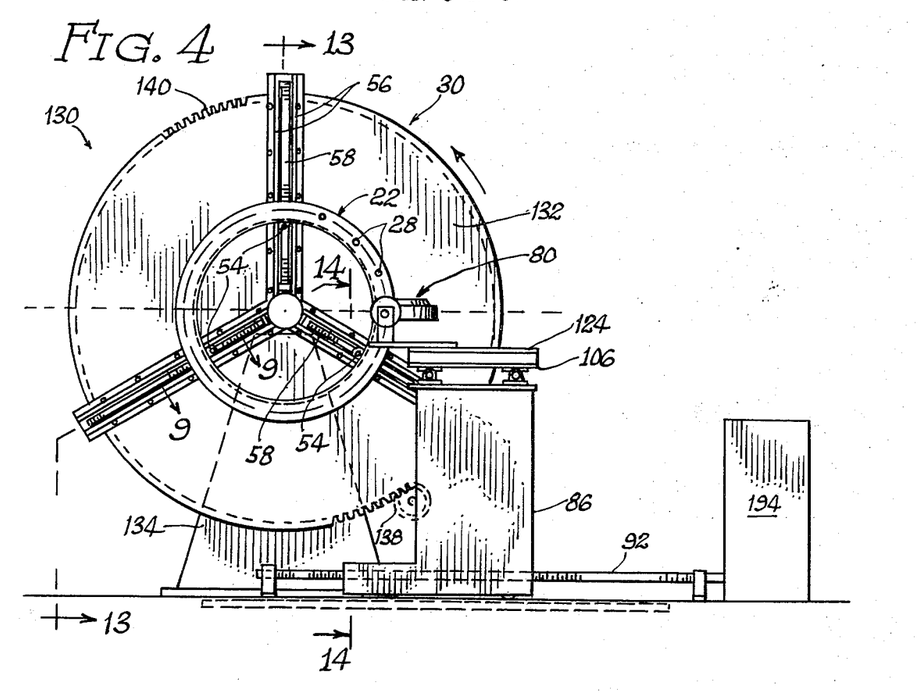
FIG. 4 is a front elevation of the machine of FIG. 3.
Figures 5, 7:
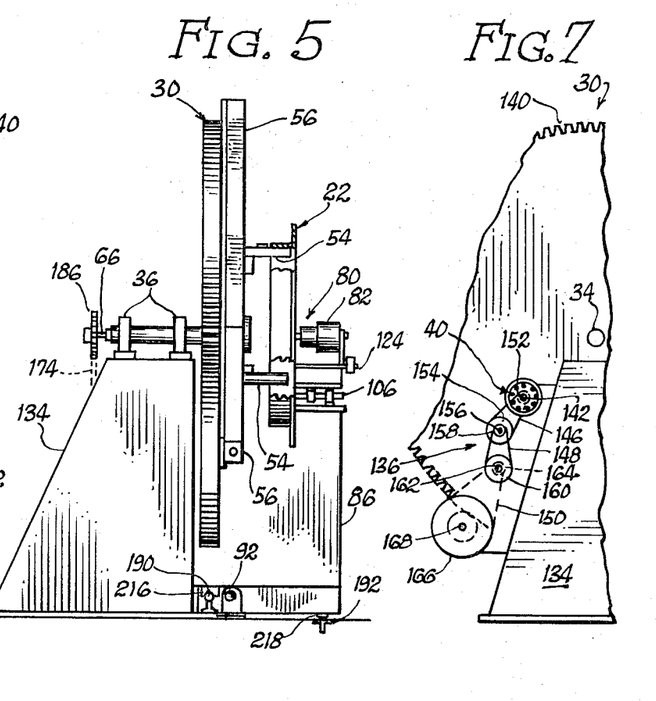
FIG. 5 is a left side elevation of the machine of FIG. 3.
FIG. 7 is a fragmentary rear elevation showing details of the indexing drive for the machine of FIG. 3.
Figure 6:
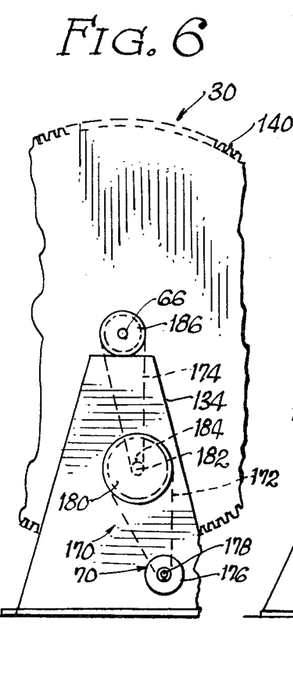
FIG. 6 is a fragmentary diagrammatic rear elevation showing details of the ring-clamping drive for the machine of FIG. 3.

Further details of the driving connection 136 are shown in FIG. 7. As shown, the driving connection 136 is in the form of a drive train utilizing three chains 146, 148 and 150. The chain 146 is strung around sprockets 152 and 154 on the motor shaft 42 and a shaft 156. The second chain 148 is strung around sprockets 158 and 160 on the shaft 156 and a shaft 162. The third chain 150 is threaded around sprockets 164 and 166 on the shaft 162 and a shaft 168 which supports the pinion 138 (FIGS. 3 and 4). It will be understood that any suitable drive train may be employed.

In the machine 130 of FIGS. 3–15, the operating mechanism for the clamping jaws 54 is basically the same as in FIG. 1. However, a modified driving connection 170 (FIG. 6) is provided between the drive motor 70 and the rotary adjusting shaft 66. As shown, the driving connection 170 comprises two chains 172 and 174. The first chain 172 is strung around a sprocket 176 on the shaft 178 of the motor 70 and a larger sprocket 180 on a shaft 182. Similarly, the second chain 174 is threaded around a small sprocket 184 on the shaft 182 and a larger sprocket 186 on the operating shaft 66. The mechanism which operates the jaws or fingers 54 is substantially the same as described in connection with FIGS. 1 and 2.

In the embodiment of FIG. 3, the main carriage 86 for the hole-forming device 80 is mounted on guide means 188 in the form of rails 190 and 192. As shown in FIG. 3, the rail 190 projects upwardly fro the floor level, while the rail 192 is flat and is mounted at the floor level. The arrangement of the lead screw 92 (FIG. 4) for the main carriage 86 is essentially the same as previously described. The precision drive 90 for the lead screw 92 is incorporated into a drive unit 194, as shown in FIG. 8.

Figure 8:
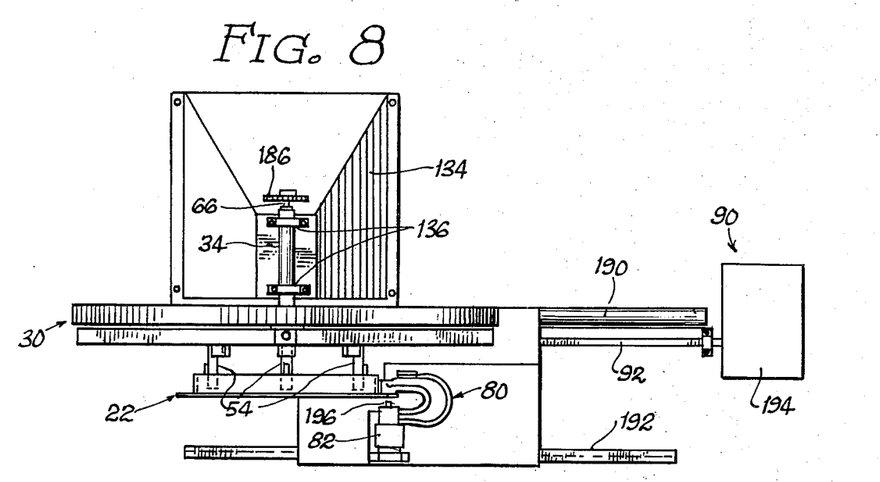
FIG. 8 is a top plan view of the machine of FIG. 3.
Figure 9:
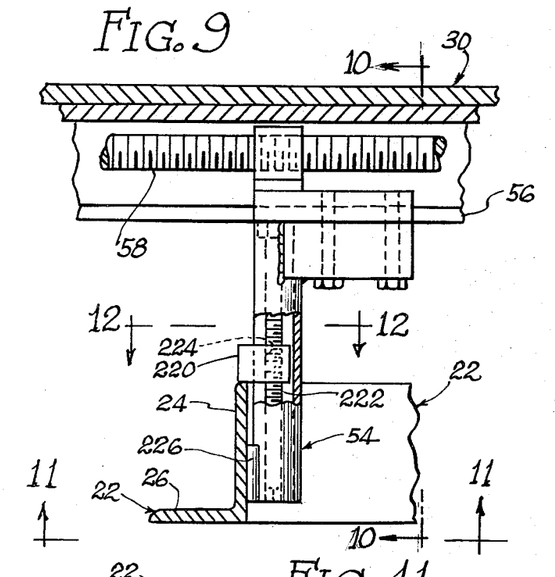
FIG. 9 is a fragmentary enlarged section taken generally along the line 9—9 in FIG. 4 and showing the manner in which one of the jaws clamps the angle ring.
Figure 10:
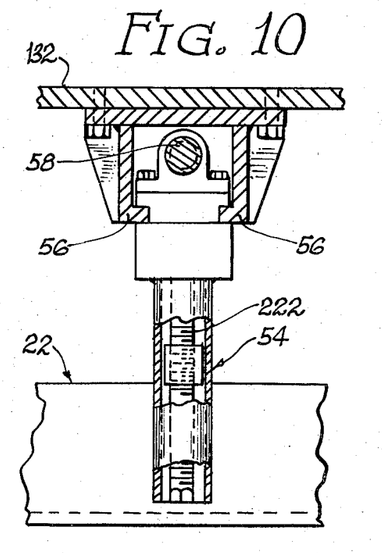
FIG. 10 is a fragmentary section, taken generally along the line 10—10 in FIG. 9.
Figure 11:
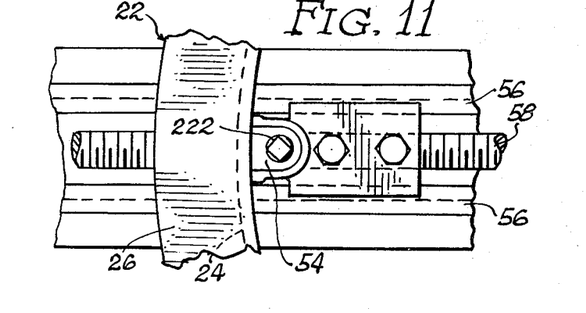
FIG. 11 is a fragmentary front elevation taken generally as indicated by the line 11—11 in FIG. 9.
Figure 12:
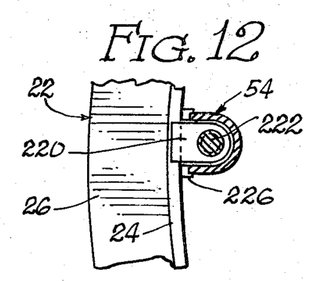
FIG. 12 is a fragmentary section taken generally along the line 12—12 in FIG. 9.
Figure 13:
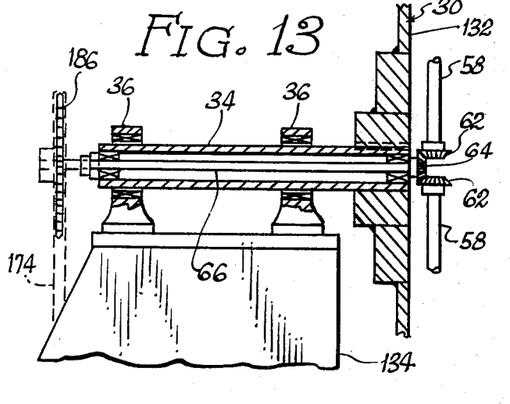
FIG. 13 is a fragmentary longitudinal section taken through the indexing head generally along the broken line 13—13 in FIG. 4.
Figure 15:
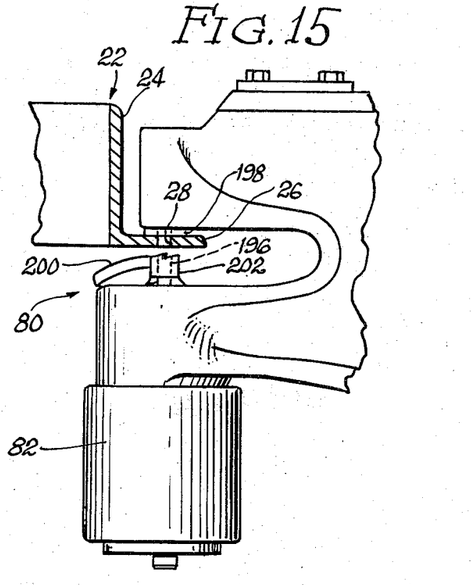
FIG. 15 is a fragmentary horizontal section taken generally along the line 15—15 in FIG. 14.

As before, the hole-forming unit 80 may assume various forms, but is illustrated in FIGS. 8 and 15 as comprising a punch 196 operable by the hydraulic cylinder 82. An apertured die 198 is provided to cooperate with the punch 196 as will be evident from FIG. 15. Guide fingers 200 may be mounted adjacent the punch 196 to guide the flange 26 of the angle ring 22 into the space between the punch 196 and the die 198. A stripper 202 is preferably provided around the punch 196 to strip the flange 26 away from the punch 196 after the hole 28 has been formed.

Figure 14:
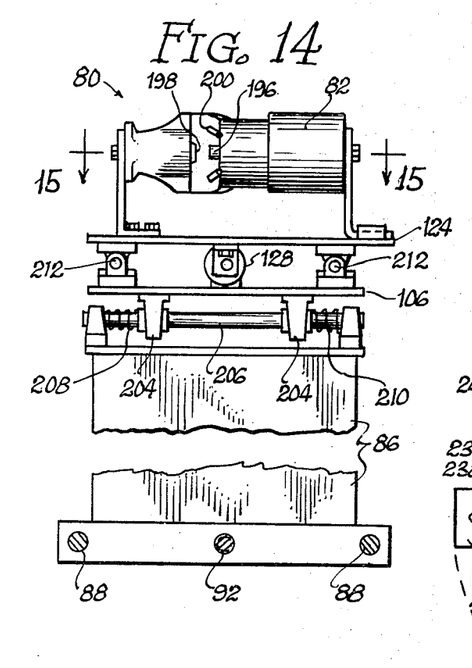
FIG. 14 is a fragmentary elevation, showing the hole-forming device and taken generally as indicated by the line 14—14 in FIG. 4.

The machine of FIGS. 3–15 includes the second and third carriages 106 and 124, generally as previously described. As shown in FIG. 14, the second carriage 106 may comprise members 204 which are slidable along guide means 206. In this case, the carriage is adapted to float along the guide means 206 and is restrained by centering springs 208 and 210. This floating arrangement assists in the alignment of the hole-forming devices 80 with the flange 26 to be punched on the angle ring 22. When the guide fingers 200 on the hole-forming device 80 engage the flange 26, the springs 208 and 210 permit the carriage 106 to float laterally so that the flange 26 can readily enter the space between the punch 196 and the die 198.

As before, the carriage 106 is movable transversely to the direction of movement of the main carriage 86, while the carriage 124 is movable parallel to the direction of movement of the main carriage. As shown in FIG. 14, the carriage 124 is movable along guide means 212 mounted on the second carriage 106. As before, the carriage 124 is adapted to be moved by the fluid power cylinder 128.

The operation of the machine 30 of FIGS. 3–15 is much the same as previously described in connection with FIGS. 1 and 2. In setting up the machine 30, the angle ring 22 is mounted on the indexing head 30 by slipping the ring around the jaws 54. If necessary, the jaws may be retracted inwardly by operating the motor 70. The ring 22 is clamped in place on the indexing head 30 by operating the motor 70 in the opposite direction so that the jaws 54 will be moved into clamping engagement with the ring 22.

The torque developed by the motor 70 may be regulated to provide the desired force between the jaws 54 and the ring 22. It will be understood that the torque developed by the motor 70 may be regulated by varying the electrical energization of the motor. For heavy, rigid angle rings, the clamping force exerted by the jaws 54 may be relatively great. However, the lighter angle rings, the clamping force should be reduced to prevent the ring from being distorted into a noncircular shape by the clamping force.

To control the radius of the pitch circle around which the holes 28 are to be punched in the angle ring 22, the main carriage 86 is moved to the correct position by operating the drive motor 94 of the precision drive 90. Preferably, the precision drive 90 is calibrated to facilitate the positioning of the main carriage 86. The electronic control unit 142 may comprise electronic computing apparatus for electronically calibrating the motor 94. Thus, push-button controls 214 are preferably provided on the electronic control unit 142 so that the desired pitch radius can be selected on a digital basis.

The hole-forming unit 80 (FIG. 14 and 15) is advanced into operative relation to the flange 26 on the angle ring 22 by operating the power cylinder 128 to advance the carriage 124. The curved guide fingers 200 insure that the flange 26 will be guided into the space between the punch 196 and the die 198.

The number of holes to be punched around the ring is fed into the electronic control unit 142 (FIG. 3) by operating the digital push-buttons 144. The first hole may then be punched by operating the fluid power cylinder 82 (FIGS. 8 and 15) so that it advances and then retracts the punch 196.

The indexing motor 40 (FIG. 7) is then energized to turn the indexing head 30 through the desired angle to the position at which the next hole is to be punched. The angular interval is controlled by the calibration of the motor 40 under the control of the electronic control unit 142 which divides the full revolution of the indexing head 30 into the correct number of angular parts determined by the number of holes to be punched. Following the punching of each hole 28 in the angle ring 22, the indexing motor 40 advances the indexing head 30 to the position at which the next hole is to be punched.

If desired, the electronic control unit 142 can be calibrated to vary the angular intervals between the holes rather than punching the holes at equal angular intervals.

It will be understood that the guide means for the main carriage 86 may be varied. This is illustrated by FIG. 14, which shows the guide means 88 of FIG. 1 in the form of parallel horizontal bars to guide the carriage 86. In the construction of FIG. 5, the carriage 86 is provided with rollers 216 and 218 adapted to ride along the rails or tracks 190 and 192.

As shown in FIGS. 9–12, it is preferred to provide adjustable stops 220 on the jaws or fingers 54 for engagement by the cylindrical flange 24 of the angle ring 22 to assist in adjusting the alignment between the angle ring and the hole-forming device 80. The adjustable stops 220 also make it possible to adjust the extent to which the angle ring 22 is spaced forwardly from the supporting plate 132 of the indexing head 30. As shown in FIGS. 9–12, each adjustable stop 220 is slidable within the corresponding jaw or finger 54, which is channel-shaped.

A manually operable adjusting screw 222 is rotatably mounted within each jaw 54 and is threaded through an internally threaded opening 224 in the adjustable stop 220. By turning the three adjusting screws 222, the positions of the three adjustable stops 220 can be adjusted. Each of the illustrated jaws 54 has a block or pad 226 welded or otherwise secured thereto for engagement with the angle ring 22.

As previously described, the holes 28 in the angle ring 22 may be formed around a pitch circle having a particular radius determined by the position of the main carriage 86. In some cases, it may be preferable to form the holes at a particular distance from the inner or outer periphery of the angle ring. For example, this may be desirable if the angle rings to receive the holes are slightly out of round.

Figure 16:
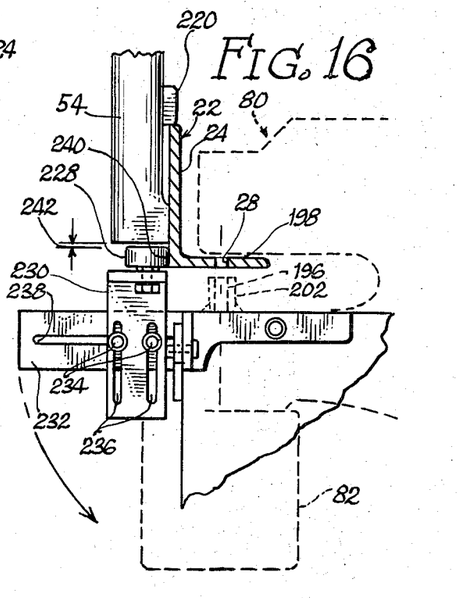
FIG. 16 is a diagrammatic view somewhat similar to FIG. 15, but showing a modified construction.

FIG. 16 illustrates a modified arrangement for forming the holes 28 at a predetermined distance from the periphery of the angle ring 22. It will be seen that the hole-forming device 80 of FIG. 16 is provided with an adjustable follower or stop 228 adapted to ride along the periphery of the angle ring 22. As shown, the follower 228 is in the form of a roller rotatably mounted on an adjustable bracket or arm 230 clamped or otherwise secured to a bracket 232 on the hole-forming device 80.

In the illustrated construction, clamping screws 234 extend through lots 236 and 238 in the brackets 230 and 232. This adjustable clamping arrangement makes it possible to adjust the spacing between the follower 228 and the center line of the punch 196. Moreover, the follower 228 can be adjusted to the proper angle relative to the angle ring 22. It is also possible to adjust the follower 228 so that there will be clearance between the follower 228 and the ends of the jaws or fingers 54.

As shown in FIG. 16, the follower roller 228 is adjusted to engage the inner periphery of the angle ring 22 at the heel 240 of the ring. It is preferred to adjust the movable stops 220 on the jaws 54 so that the heel 240 of the angle ring 22 projects outwardly beyond the ends of the jaws 54. In this way, the proper clearance can readily be provided between the roller 228 and the ends of the jaws 54. Such clearance is indicated at 242.

When the adjustable follower 228 is being used, the third carriage 124 for the hole-forming device 80 is allowed to float so that the follower 228 will ride along the periphery of the angle ring 22 at all times. A small amount of fluid pressure may be maintained in the fluid pressure cylinder 128 to hold or bias the follower 228 against the angle ring 22. Instead of using fluid pressure, a spring or other resilient means may be employed to bias the follower 228 against the angle ring 22.

It will be understood that various resilient or yieldable means may be employed instead of the springs 208 and 210 of FIG. 14 to restrain the floating cross carriage 124 so that the hole-forming device 80 will automatically align itself with the angle ring or other workpiece.

In FIG. 1, the clamp operating motor 70 may be provided with a torque control unit 250 adapted to regulate the torque developed by the motor. In this way, the clamping forces between the jaws 54 and the angle ring 22 can be varied. It will be understood that various other force regulating means may be provided to adjust the clamping force.

The indexing motor 40 of FIG. 1 may be provided with an indexing control unit 252 corresponding generally to the electronic control unit 142 of FIG. 3, for controlling and calibrating the motor 40 so that it may be operated to advance the indexing head 30 through precisely the necessary angle to achieve the desired spacing between the holes 28. In this way, the desired number of holes can be accurately formed and located in the angle ring or other workpiece.

The drive motor 94 of FIG. 1 for the main carriage 86 may be provided with a radius control unit 254 whereby the motor 90 can be calibrated and operated to move the carriage 86 with a high degree of precision to the correct radial position. In this way, the hole-forming device 80 will form the holes 28 around the correct pitch circle.

As in the case of FIG. 14, the cross carriage 106 of FIG. 1 may be free-floating and restrained by resilient centering means so that the hole-forming device 80 will automatically align itself with the flange 26 on the angle ring 22.

Various other modifications, alternative constructions and equivalents may be employed as will be evident to those skilled in the art.

I claim:

1. A machine for forming holes in a generally circular workpiece,
   comprising an indexing head disposed in a generally vertical plane,
   means supporting said indexing head for rotation about a generally horizontal axis,
   clamping means on said head for securing the workpiece thereto in a generally vertical plane,
   power indexing drive means for turning said indexing head to a series of predetermined positions,
   a hole-forming device disposed adjacent said indexing head,
   carriage means supporting said hole-forming device for movement in a generally radial direction relative to said indexing head to bring said hole-forming device into operative relation to said workpiece,
   and power feeding means for operating said carriage means in opposite directions,
   said clamping means including a plurality of angularly spaced jaws,
   guide means on said indexing head and supporting said jaws for generally radial inward and outward movement,
   and an operating mechanism for simultaneously moving said jaws along said guide means,
   said operating mechanism comprising a plurality of feed screws rotatably mounted on said indexing head for simultaneously moving said respective jaws,
   and clamp drive means for simultaneously rotating said feed screws.

2. A machine according to claim 1,
   in which said clamp drive means comprises a rotatable shaft coaxial with said indexing head,
   and gear means forming connections between said rotatable shaft and said feed screws.

3. A machine according to claim 2,
   in which said gear means includes driven bevel gears on said feed screws,
   and a driving bevel gear on said shaft and meshing with said driven bevel gears.

4. A machine according to claim 2,
   including clamp power actuating means connected to said rotatable shaft.

5. A machine for forming holes in a generally circular workpiece,
   comprising an indexing head disposed in a generally vertical plane,
   means supporting said indexing head for rotation about a generally horizontal axis,
   clamping means on said head for securing the workpiece thereto in a generally vertical plane,
   power indexing drive means for turning said indexing head to a series of predetermined positions,
   a hole-forming device disposed adjacent said indexing head,
   carriage means supporting said hole-forming device for movement in a generally radial direction relative to said indexing head to bring said hole-forming device into operative relation to said workpiece,
   and power feeding means for operating said carriage means in opposite directions,
   said carriage means including a cross carriage for supporting said hole-forming device,
   and means supporting said cross carriage for floating movement in a direction transverse to the plane of the workpiece.

6. A machine according to claim 5,
   including biasing means for restraining the free-floating movement of said cross carriage.

7. A machine according to claim 5,
   including resilient means for restraining the free-floating movement of said cross carriage.

8. A machine for forming holes in a generally circular workpiece,
   comprising an indexing head disposed in a generally vertical plane,
   means supporting said indexing head for rotation about a generally horizontal axis,
   clamping means on said head for securing the workpiece thereto in a generally vertical plane,
   power indexing drive means for turning said indexing a hole-forming device disposed adjacent said indexing head, carriage means supporting said hole-forming device for movement in a generally radial direction relative to said indexing head to bring said hole-forming device into operative relation to said workpiece, and power feeding means for operating said carriage means in opposite directions, said carriage means including a reciprocable carriage for supporting said hole-forming device, means supporting said reciprocable carriage for floating movement in a generally radial direction relative to the axis of said indexing head, and follower means connected to said reciprocable carriage for causing said carriage to follow the periphery of the workpiece.

9. A machine according to claim 8,
in which said follower means includes a roller for engaging and following the periphery fo the workpiece.

10. A machine for forming holes in a generally circular workpiece,
comprising an indexing head,
means supporting said indexing head for rotation about a predetermined axis,
clamping means on said head for securing the workpiece thereto,
power indexing drive means for turning said indexing head to a series of positions,
hole-forming device disposed adjacent said indexing head,
carriage means supporting said hole-forming device for movement in a generally radial direction relative to said workpiece,
and power feeding means for operating said carriage means in opposite directions,
said carriage means including a cross carriage for supporting said hole-forming device,
and means supporting said cross carriage for floating movement in a direction transverse to the plane of the workpiece.

11. A machine according to claim 10,
including biasing means for restraining the floating movement of said cross carriage.

12. A machine according to claim 10,
including resilient means for restraining the floating movement of said cross carriage.

13. A machine for forming holes in a generally circular workpiece,
comprising an indexing head,
means supporting said indexing head for rotation about a predetermined axis,
clamping means on said head for securing the workpiece thereto,
power indexing drive means for turning said indexing head to a series of positions,
a hole-forming device disposed adjacent said indexing head,
carriage means supporting said hole-forming device for movement in a generally radial direction relative to said workpiece,
and power feeding means for operating said carriage means in opposite directions,
said carriage means including a reciprocable carriage for supporting said hole-forming device, means supporting said reciprocable carriage for floating movement in a generally radial direction relative to the axis of said indexing head, and follower means connected to said reciprocable carriage for causing said carriage to follow the periphery of the workpiece.

14. A machine according to claim 13,
in which said follower means includes a roller for engaging and following the periphery of the workpiece.

15. A machine for forming holes in a generally circular workpiece,
comprising an indexing head,
means supporting said indexing head for rotation about a predetermined axis,
clamping means on said head for securing the workpiece thereto,
power indexing drive means for turning said indexing head to a series of positions,
a hole-forming device disposed adjacent said indexing head,
carriage means for supporting said hole-forming device,
means supporting said carriage means for floating movement in a generally radial direction relative to the axis of said indexing head,
and follower means connected to said carriage means for causing said carriage means to follow the periphery of the workpiece.

16. A machine according to claim 15,
in which said follower means includes a roller for engaging and following the periphery of the workpiece.

17. A machine according to claim 15,
in which said carriage means includes a cross carriage for supporting said hole-forming device,
and means supporting said cross carriage for floating movement in a direction transverse to the plane of the workpiece.

18. A machine according to claim 17,
including biasing means for restraining the floating movement of said cross carriage.

19. A machine according to claim 17,
including resilient means for restraining the floating movement of said cross carriage.

20. A machine for forming holes in a generally circular workpiece,
comprising an indexing head,
means supporting said indexing head for rotation about a predetermined axis,
clamping means on sid head for securing the workpiece thereto,
power indexing drive means for turning said indexing head to a series of positions,
a hole-forming device disposed adjacent said indexing head,
carriage means supporting said hole-forming device for movement in a generally radial direction relative to said workpiece,
and power feeding means for operating said carriage means in opposite directions,
said clamping means including a plurality of angularly spaced jaws,
guide means on said indexing head and supporting said jaws for generally radial inward and outward movement, and an operating mechanism for simultaneously moving said jaws along said guide means, said operating mechanism comprising a plurality of feed screws rotatably mounted on said indexing head for simultaneously moving said respective jaws, and clamp drive means for simultaneously rotating said feed screws.

21. A machine according to claim 20, in which said clamp drive means comprises a rotatable shaft coaxial with said indexing head, and gear means forming connections between said rotatable shaft and said feed screws.

22. A machine according to claim 21, in which said gear means includes driven bevel gears on said feed screws, and a driving bevel gear on said shaft and meshing with said driven bevel gears.

23. A machine according to claim 22, including clamp power actuating means connected to said rotatable shaft.

24. A machine for performing operations on a generally circular workpiece, comprising an indexing head, means supporting said indexing head for rotation about a predetermined axis, clamping means on said head for securing the workpiece thereto, indexing drive means for turning said indexing head to a series of positions, and a device disposed adjacent said indexing head for performing operations on said workpiece, said clamping means including a plurality of angularly spaced jaws, guide means on said indexing head and supporting said jaws for generally radial inward and outward movement, and an operating mechanism for simultaneously moving said jaws along said guide means, said operating mechanism comprising a plurality of feed screws rotatably mounted on said indexing head for simultaneously moving said respective jaws, and clamp drive means for simultaneously rotating said feed screws.

25. A machine according to claim 24, in which said clamp drive means comprises a rotatable shaft coaxial with said indexing head, and gear means forming connections between said rotatable shaft and said feed screws.

26. A machine according to claim 25, in which said gear means includes driven bevel gears on said feed screws, and a driving bevel gear on said shaft and meshing with said driven bevel gears.

27. A machine according to claim 26, including clamp power actuating means connected to said rotatable shaft.

28. A machine for forming holes in a generally circular workpiece, comprising an indexing head disposed in a generally vertical plane, means supporting said indexing head for rotation about a generally horizontal axis, clamping means on said head for securing the workpiece thereto in a generally vertical plane, power indexing drive means for turning said indexing head to a series of predetermined positions, a hole-forming device disposed adjacent said indexing head, carriage means supporting said hole-forming device for movement in a generally radial direction relative to said indexing head to bring said hole-forming device into operative relation to said workpiece, and power feeding means for operating said carriage means in opposite directions, said clamping means including a plurality of angularly spaced jaws, guide means on said indexing head and supporting said jaws for generally radial inward and outward movement, and an operating mechanism for simultaneously moving said jaws along said guide means, said operating mechanism comprising a plurality of positive drive trains mounted on said indexing head for simultaneously moving said respective jaws, and clamp drive means for simultaneously operating said drive trains.

29. A machine for forming holes in a generally circular workpiece, comprising an indexing head disposed in a generally vertical plane, means supporting said indexing head for rotation about a generally horizontal axis, clamping means on said head for securing the workpiece thereto in a generally vertical plane, power indexing drive means for turning said indexing head to a series of predetermined positions, and a hole-forming device disposed adjacent said indexing head for forming holes in said workpiece, said clamping means including a plurality of angularly spaced jaws, guide means on said indexing head and supporting said jaws for generally radial inward and outward movement, and an operating mechanism for simultaneously moving said jaws along said guide means, said operating mechanism comprising a plurality of positive drive trains mounted on said indexing head for simultaneously moving said respective jaws, and clamp drive means for simultaneously operating said drive trains.

30. A machine for performing operations on a generally circular workpiece, comprising an indexing head, means supporting said indexing head for rotation about a predetermined axis, clamping means on said head for securing the workpiece thereto, indexing drive means for turning said indexing head to a series of positions, and a device disposed adjacent said indexing head for performing operations on said workpiece, said clamping means including a plurality of angularly spaced jaws, guide means on said indexing head and supporting said jaws for generally radial inward and outward movement, and an operating mechanism for simultaneously moving said jaws along said guide means, said operating mechanism comprising a plurality of positive drive trains mounted on said indexing head for simultaneously moving said respective jaws, and clamp drive means for simultaneously operating said drive trains.

* * * * *

UNITED STATES PATENT OFFICE
CERTIFICATE OF CORRECTION

Patent No. 3,835,744　　　　　Dated September 17, 1974

Inventor(s) William H. Wendt III

It is certified that error appears in the above-identified patent and that said Letters Patent are hereby corrected as shown below:

Column 5, line 15, "92" should read --94--.

Column 6, line 39, "fro" should read --from--.

Column 8, line 51, "lots" should read --slots--.

Column 10, after the last line, the following is omitted and should be inserted: --head to a series of predetermined positions,--.

Column 11, line 21, "fo" should read --of--.

Column 12, line 52, "sid" should read --said--.

Signed and sealed this 26th day of November 1974.

(SEAL)
Attest:

McCOY M. GIBSON JR.
Attesting Officer

C. MARSHALL DANN
Commissioner of Patents